June 16, 1925.
F. L. MINNICK ET AL
VEHICLE WHEEL
Filed May 6, 1924
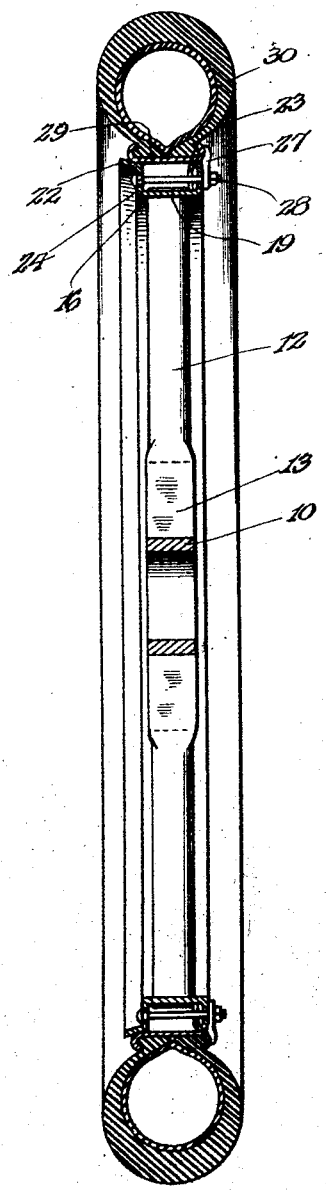
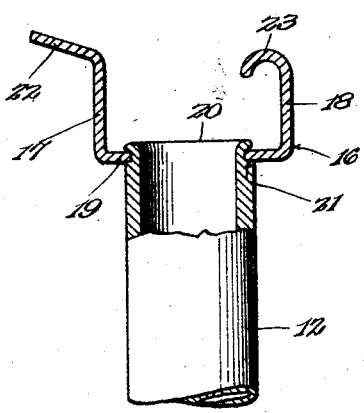
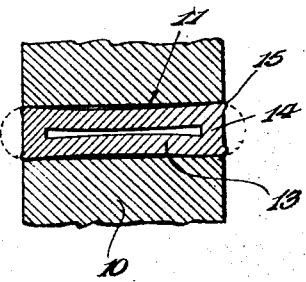
Inventors
F. L. Minnick.
H. T. Dean.
By
Lacey & Lacey, Attorneys Patented June 16, 1925.

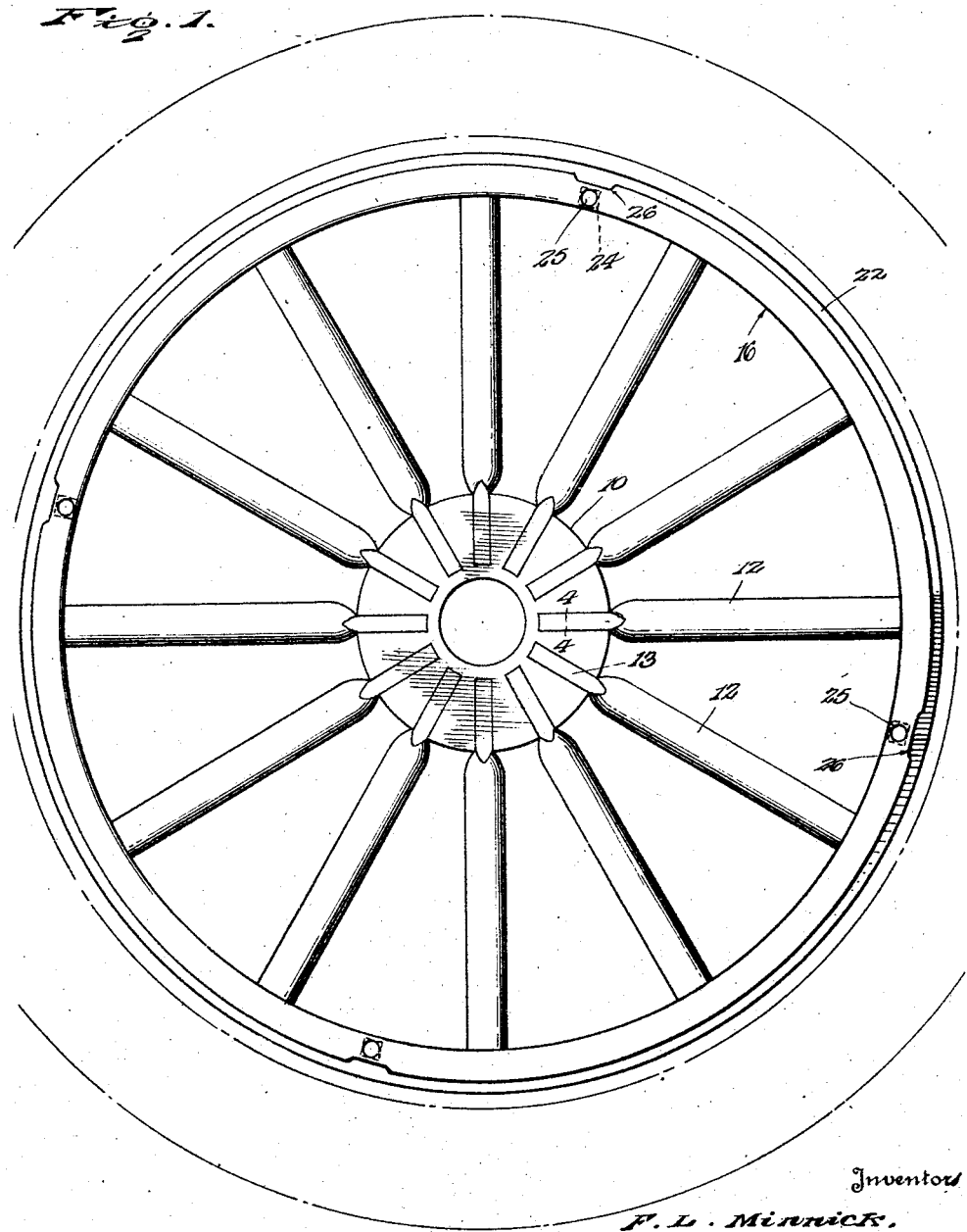

1,542,076

UNITED STATES PATENT OFFICE.

FREDERICK L. MINNICK AND HIGHLAND Z. DEAN, OF ELLENSBURG, WASHINGTON, ASSIGNORS TO DEAN-MINNICK STEEL WHEEL COMPANY, OF SEATTLE, WASHINGTON, A CORPORATION.

VEHICLE WHEEL.

Application filed May 6, 1924. Serial No. 711,427.

*To all whom it may concern:*

Be it known that we, FREDERICK L. MINNICK and HIGHLAND Z. DEAN, citizens of the United States, residing at Ellensburg, in the county of Kittitas and State of Washington, have invented certain new and useful Improvements in Vehicle Wheels, of which the following is a specification.

This invention relates to an improved vehicle wheel and seeks, among other objects, to provide a wheel embodying an all-steel construction and wherein the use of fastening devices for securing the parts of the wheel together will be eliminated.

The invention seeks, as a further object, to provide a novel mounting for the spokes of the wheel.

And the invention seeks, as a still further object, to provide a wheel which will be strong and durable and which will be well adapted for general use.

Other and incidental objects will appear hereinafter.

In the drawings:

Figure 1 is a side elevation of our improved wheel.

Figure 2 is a vertical sectional view through the wheel and showing a rim and tire thereon.

Figure 3 is an enlarged detail sectional view showing the manner in which the spokes are connected at their outer ends to the wheel rim, and Figure 4 is an exaggerated detail sectional view showing the manner in which the spokes are connected at their inner ends to the hub.

In carrying the invention into effect, we employ a hub 10 provided with a plurality of radial slots 11 opening through the side faces of the hub and radiating from the hub are spokes 12. These spokes are of tubular construction and are pressed at their inner ends to form flattened terminals 13 which are received in the slots 11. As shown in dotted lines in Figure 4, the terminals 13, as initially formed, are wider than the hub and after said terminals have been inserted in the slots 11, the edges of said terminals projecting at the sides of the hub, are swedged into the slots. In thus forcing the metal of the spoke terminals back into the slots, wedge portions 14 are produced along the side margins of said terminals which wedge portions are, of course, jammed in the side portions of the slots, while at the side faces of the hub slight beads or locking ribs 15 are produced. These beads are deflected in a direction tending to overhang the side edges of the slots so that the beads, in conjunction with the wedge portions, will securely lock the spokes against sidewise movement with respect to the hub while the wedge portions, in being jammed in the slots, will also lock the spokes against radial movement. A firm, rigid and secure connection is thus provided between the spokes and the hub.

Surrounding the spokes is a channeled-shaped felly 16 having parallel inner and outer side walls 17 and 18 connected by a bottom wall 19. The felly is rolled or pressed from a single piece of material and is a continuous annular structure. At their outer ends, the spokes 12 are, as particularly shown in Figure 3, turned to produce tenons 20 as well as to define external annular stop shoulders 21 and, as will be observed, the tenons are inserted through suitable openings in the bottom wall 19 of the felly so that the shoulders 21 abut said wall, when the tenons 20 are spun down or swelled at their outer ends to overlie the wall rigidly securing the felly to the spokes. The wall 17 is termed the inner side wall since, when the wheel is mounted upon a vehicle, said wall will be disposed next to the vehicle and formed on said wall is an overhanging inclined annular flange 22 while the outer side wall 18 is provided with an inturned trough-shaped annular flange 23, the crown of which is substantially on a level with the inner edge of the flange 22. Since the felly is unbroken throughout its length, the spokes 12 are, in constructing the wheel, first secured to the felly when the hub 10 is then assembled upon the inner ends of the spokes.

Formed on the inner side wall 17 of the felly, at suitably spaced points, are square openings 24 and formed in the outer side wall 18 opposite said square openings, are circular openings 25 at which the flange 23 of said wall is, as particularly brought out in Figure 1, formed with indentations 26. These indentations are provided to accommodate appropriate rim clamps 27 secured by bolts 28 extending through said openings. As brought out in Figure 2, the felly is adapted to receive any conventional rim such as indicated at 29 and in conjunction with the rim, we have illustrated a conventional tire 30. The rim 29 is applied by slipping the rim over the felly until said rim rests at one side upon the flange 22 of the felly and at its opposite side upon the flange 23. The rim clamps 27 are then brought to position bearing against the adjacent side edge of the rim, when the bolts 28 are tightened for crowding the rim laterally against the flange 22 and tightly binding the rim in position.

Having thus described the invention, what we claim is:

1. In a metallic vehicle wheel, a hub having slots therein, and spokes swedged at their inner ends in said slots.

2. In a metallic vehicle wheel, a hub having radial slots therein, and tubular spokes provided at their inner ends with flattened terminals swedged in said slots.

3. In a metallic vehicle wheel, a hub having radial slots therein, opening through the side faces of the hub, spokes provided at their inner ends with terminals inserted in said slots, the terminals being normally wider than the hub to project at the side faces of the hub, and locking ribs formed from the projecting portions of said terminals to overhang the side faces of the hub.

4. In a metallic vehicle wheel, a hub having radial slots therein opening through the side faces of the hub, spokes provided at their inner ends with terminals inserted in said slots, the terminals being normally wider than the hub to project at the side faces thereof, and locking ribs swedged from the projecting portions of said terminals to overhang the side faces of the hub.

In testimony whereof we affix our signatures.

FREDERICK L. MINNICK. [L. S.]
HIGHLAND Z. DEAN. [L. S.]